United States Patent
Kobayashi

Patent Number: 6,165,866
Date of Patent: Dec. 26, 2000

[54] MANUFACTURING METHOD FOR LAMINATED CHIP ELECTRONIC PART

[75] Inventor: Keiichi Kobayashi, Tokyo, Japan

[73] Assignee: Taiyo Yuden Co., Ltd., Tokyo, Japan

[21] Appl. No.: 09/209,430

[22] Filed: Dec. 11, 1998

[30] Foreign Application Priority Data

Dec. 16, 1997 [JP] Japan ..................................... 9-346766

[51] Int. Cl.$^7$ ................................................. H01L 21/20
[52] U.S. Cl. ........................... 438/396; 438/329; 438/612
[58] Field of Search .............................. 438/396, 43, 274, 438/329, 612; 338/21, 274, 308; 310/328, 365, 366

[56] References Cited

U.S. PATENT DOCUMENTS

| | | | |
|---|---|---|---|
| 5,153,477 | 10/1992 | Jomura et al. | 310/328 |
| 5,643,804 | 7/1997 | Arai et al. | 437/21 |
| 5,994,995 | 11/1999 | Ogasawara et al. | 338/21 |

FOREIGN PATENT DOCUMENTS

| | | | |
|---|---|---|---|
| 8-55726 | 2/1996 | Japan | H01F 17/00 |
| 9-129447 | 5/1997 | Japan | H01F 17/00 |

*Primary Examiner*—David Nelms
*Assistant Examiner*—Phuc T. Dang
*Attorney, Agent, or Firm*—Lowe Hauptman Gopstein Gilman & Berner, LLP

[57] ABSTRACT

A method to manufacture a laminated chip capacitor by laminating and bonding elementary body sheets 14$a$, 14$b$ which have via holes 17$a$, 17$b$ and internal electrodes 11$a$, 11$b$, and are made of an insulating material, external electrode sheets 15$a$, 15$b$ which are made of an insulating material, and a dummy sheet 16 which has via hole 17$a$ and is made of an insulating material, treating the sheets to eliminate a binder, and calcining the sheets. This method allows the external electrode sheets 15$a$, 15$b$ to form external terminal electrodes by themselves, thereby permitting the external terminal electrodes to be formed extremely easily only on two end surfaces of an elementary body opposed to each other.

6 Claims, 12 Drawing Sheets

Laminated chip capacitor 10
Internal electrode 11b
Via hole 17b
Elementary body 12
External terminal electrode 13a
Internal electrode 11a
Via hole 17a
External terminal electrode 13b Elementary body 23
Laminated chip capacitor 20
Insulating material sheet 22
External terminal electrode 24
Internal electrode 21
External terminal electrode 24

*Fig.* 3
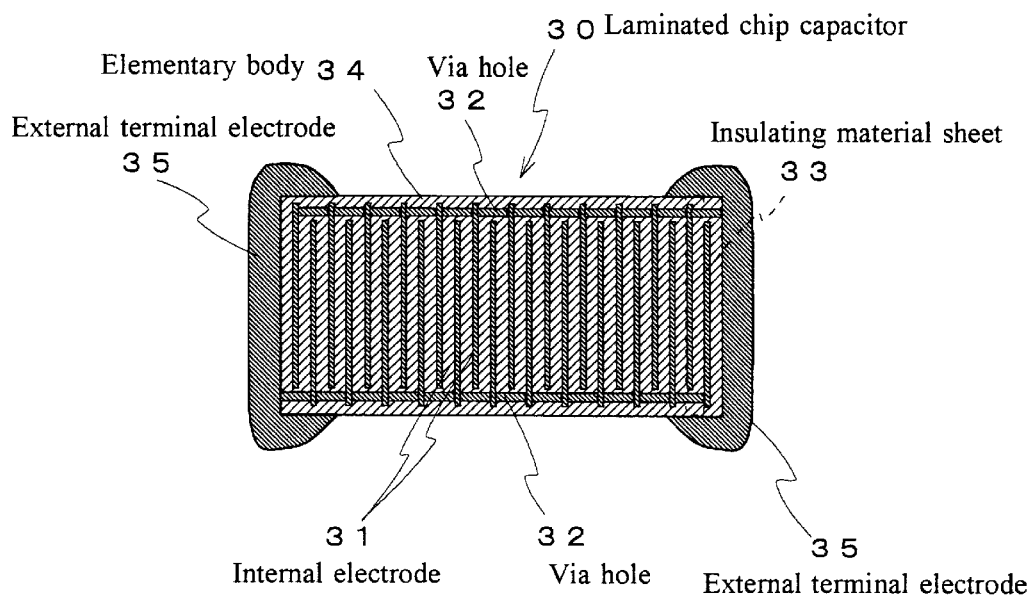
*Fig.* 4
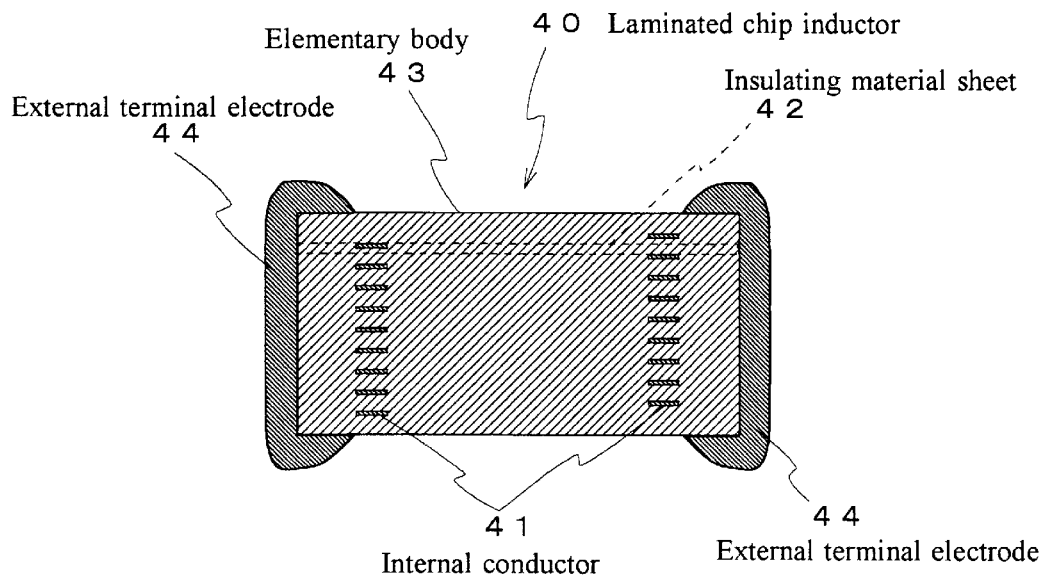

*Fig.* 9
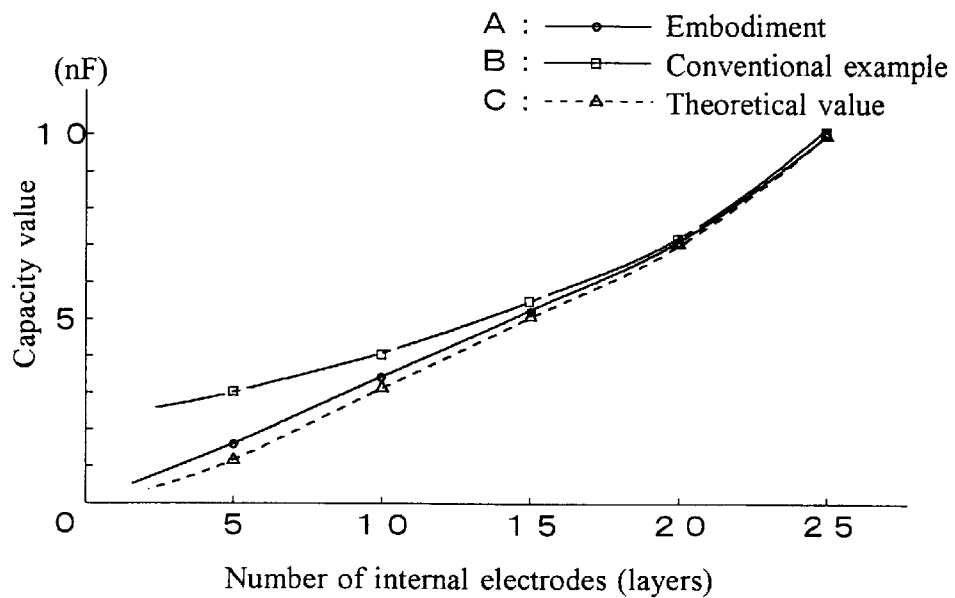
*Fig.* 10
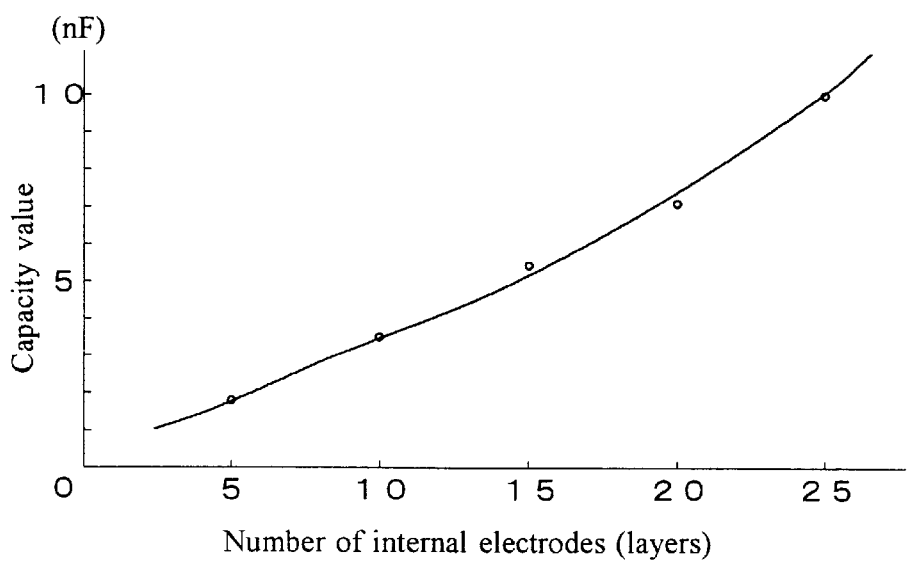

External terminal electrode
1 3 a ( 1 3 b )

1 2 Elementary body

External terminal electrode
1 3 a ( 1 3 b )

1 2 Elementary body

External terminal electrode
1 3 a ( 1 3 b )

1 2 Elementary body

Elementary body
1 2

External terminal electrode
1 3 a ( 1 3 b )

External terminal electrode
1 3 a ( 1 3 b )

1 2 Elementary body

External terminal electrode
1 3 a ( 1 3 b )

1 2 Elementary body 7 0 Laminated chip capacitor

Internal electrode 7 1 b
Via hole 7 4 b
7 2 Elementary body
7 3 b External terminal electrode
7 1 a Internal electrode
7 4 a Via hole
7 3 a External terminal electrode

MANUFACTURING METHOD FOR LAMINATED CHIP ELECTRONIC PART

BACKGROUND OF THE INVENTION

1. Field of the Invention

The present invention relates to a manufacturing method for a laminated chip electronic part, and more specifically to a manufacturing method for a laminated chip electronic part that permits the easy formation of external terminal electrodes on end surfaces only together with internal conductors.

2. Description of the Prior Art

There has been demand in the recent years for laminated chip electronic parts configured to be more compact and have higher performance than the conventional ones.

For laminated chip capacitors, for example, it is necessary to use a material with a higher dielectric constant and sheets that are thinner, but at the current stage it seems that there are limitations both to the raising of the dielectric constant of the material and to the thinning of sheets to be used for manufacturing the laminated chip capacitors.

Accordingly, a vertical laminated type chip capacitor has been proposed that has a structure that is different from the conventional structure (hereinafter referred to as the horizontal laminated type).

A conventional horizontal laminated type chip capacitor 20 is composed, as illustrated in FIG. 2 showing a side sectional view thereof, of an elementary body 23 formed by laminating insulating material sheets 22 having internal electrodes 21 formed on the surfaces thereof and a pair of external terminal electrodes 24 formed at both ends of the elementary body 23 so as to be conductively connected alternatively to the internal electrodes 21. Here, the surfaces of the internal electrodes 21 are nearly perpendicular to the end surfaces of the external electrodes 24.

In contrast, a vertical laminated chip type capacitor 30 uses an elementary body 34 formed by laminating insulating material sheets 33 which have internal electrodes 31 formed on the surfaces thereof and via holes 32 as illustrated in FIG. 3 showing a plan sectional view of the chip capacitor 30. Furthermore, a pair of external terminal electrodes 35 are coated or formed at both ends in the laminating direction, or the uppermost end and lowermost end.

The internal electrodes 31 are conductively connected alternately to one another by way of the via holes 32. The internal electrode 31 of the uppermost layer is conductively connected to one of the external electrodes 35 by way of the via hole 32, whereas the internal electrode 31 of a lowermost layer is conductively connected to the other external electrode 35 by way of the via hole 32. In this case, the surfaces of the internal electrodes 31 are nearly in parallel with the end surfaces of the external terminal electrodes 35.

The former ordinary structure (horizontal laminated type of FIG. 2) requires that a margin of at least 50 μm be reserved from the internal electrodes 21 to six surfaces of the elementary body 23, thereby limiting the obtainable maximum capacity in of itself when the elementary body 23 has a fixed size.

In contrast, the latter vertical laminated type of FIG. 3 permits formation of the internal electrodes 31 even in the vicinities of the end surfaces of the external terminal electrodes 35, thereby making it possible to obtain a maximum capacity which is larger than that of the horizontal laminated type when the elementary bodies have the same size.

In recent years, the need, for high-frequency parts has been increasing, and, laminated inductors with higher resonance frequencies ($f_o$) have been in demand.

Furthermore, it has been required or indispensable to discriminate between such high-frequency parts with markers, since mounting characteristics such as resonance frequencies vary depending on asymmetries of the parts.

Speaking concretely, a conventional horizontal laminated type chip inductor 40 is composed, as illustrated in FIG. 4 (a side sectional view thereof), of an elementary body 43 which is formed by laminating insulating material sheets 42 with internal conductors 41 and via holes formed on surfaces thereof so that the internal conductors 41 are conductively connected spirally by way of the via holes, and a pair of external terminal electrodes 44 are formed at both ends of the elementary body 43 so as to be conductively connected to both ends of a coil conductor including the spirally connected internal conductors 41.

In this case, the surfaces of the internal conductors 41 are nearly perpendicular to the end surfaces of the external electrodes 44. Furthermore, high-frequency parts mounted on conductive pattern of printed circuit boards, the produce different influences on the internal conductors 41 between for the cases in which the surfaces of the internal conductors 41 are (1) parallel to the printed circuit board and (2) perpendicular to the circuit board, thereby differentiating the characteristics of the high-frequency parts. Accordingly, it is necessary to print marks on the parts themselves to recognize the direction of the surfaces of the internal electrodes.

When the markers are printed on the parts themselves, however, it is necessary to check the markers to discriminate directions in the taping and mounting stages, thereby causing inconveniences such as a remarkable lowering of productivity.

As a result, parts which have no directivity and can cope with high frequencies are demanded in the market. As structures that meet these requirements, there are known structures (longitudinal laminated type) in which internal electrode patterns are formed in directions parallel to the end surfaces of external electrodes (Japanese Patents Application Laid-Open Nos. H8-55726, H9-129447 and so on).

A vertical laminated type chip inductor 50 is composed, as illustrated in FIG. 5 showing (a plan sectional view thereof) of an elementary body 53 that is formed by laminating insulating material sheets 52 having internal conductors 51 formed on the surfaces thereof and via holes, and a pair of external terminal electrodes 54 that are coated or formed at both ends in the laminating direction.

The internal conductors 51 are conductively connected spirally by way of the via holes, thereby forming a coil conductor both ends of which are conductively connected to the external terminal electrodes 54 respectively by way of the via holes. In this case, the surfaces of the internal conductors 51 are nearly parallel to end surfaces of the external terminal electrodes 54.

Since vertical laminated chip inductor 50 always has the surfaces of the internal conductors 51 perpendicular to a printed circuit board at the stage of mounting high-frequency parts on the printed circuit board, it does not allow influences due to conductive patterns on the printed circuit board to vary depending on the mounting conditions on the printed circuit board or the like, thereby not differentiating the characteristics of such high-frequency parts.

However, the conventional vertical laminated type chip capacitor described above (see FIG. 3) has external terminal electrodes 35 that are formed on the end surfaces and four side surfaces in the vicinity of the end surfaces of the elementary body 34, which allows the external terminal electrode 35 formed on the side surfaces of the elementary body 34 to overlap the internal electrodes 31 on the side of the other electrode, thereby producing a floating capacitance between the external terminal electrode 35 and the internal electrodes 31. Accordingly, this vertical laminated type chip capacitor poses a problem in that it reduces the correlation between a number of the internal electrodes 31 and an actually obtained capacity value, thereby making it hard to design a capacitor having a precise desired capacitance value.

On the other hand, the conventional vertical laminated type chip inductor described above (see FIG. 5) poses, like the capacitor described above, a problem in that it has a floating capacitance between the internal conductors 51 and the external terminal electrodes 54, depending on the size of the external terminal electrodes 54, thereby lowering the resonance frequency ($f_0$).

In order to solve these problems, there has been considered a method of coating the external terminal electrodes 35 or 54 only on the end surfaces of the elementary body 34 or 53, except for the side surfaces thereof. However, this method requires setting of an external electrode coating machine under delicate conditions, thereby tending to allow voids to be formed between the elementary body 34 or 53 and the external terminal electrodes 35 or 54 coated thereto. Further, this method involves a problem in that it is difficult to ensure a high bond strength between the elementary body 34 or 53 and the external terminal electrodes 35 or 54, thereby making it difficult to perform stable coating of external electrodes.

Furthermore, this method allows external electrodes to be formed only by coating a conductive paste onto a calcined laminated chip with a terminator or the like and drying or baking the paste. Accordingly, this method prolongs the process lead time in manufacturing of a laminated chip electronic part. This fact applies also to capacitors that have general horizontal laminated structures.

BRIEF SUMMARY OF THE INVENTION

A primary object of the present invention is to provide a manufacturing method for a laminated chip electronic part that is capable of easily forming external terminal electrodes on the end surfaces of an elementary body only and of reducing the number of manufacturing steps.

The manufacturing method for a laminated chip electronic part according to the present invention is a method that manufactures a laminated chip electronic part composed of a laminated elementary body with internal conductors to make up an electronic element, external terminal electrodes formed at least on either of the end surfaces of the elementary body corresponding to an upper layer or a lower layer in the laminated structure of the elementary body, and terminals for the electronic element connected to the external terminal electrodes, wherein the manufacturing method comprises a step to laminate a plurality of elementary body sheets composed of insulating material sheets with internal conductors formed on the surfaces thereof to compose the electronic element, a step to laminate external electrode sheets composed of conductive material sheets with at least either of the uppermost layer or the lowermost layer of the laminated elementary material sheets and a step to calcine the laminated elementary body composed of the laminated elementary sheets and the laminated external electrode sheets. Upon termination of the calcination, the external electrode sheets form external terminal electrodes on a laminated part manufactured by the manufacturing method described above.

This manufacturing method for a laminated chip electronic part forms an electronic element such as a capacitor or an inductor with internal conductors formed on the elementary body sheets by laminating a plurality of elementary body sheets and conductively connects the terminals of the electronic element to external electrode sheets by way of via holes or the like.

Furthermore, the manufacturing method forms the external terminal electrodes with the external electrode sheets upon calcination of the laminated body. Furthermore, the manufacturing method is capable of forming the external terminal electrodes only on an end surface since the external electrode sheets themselves are conductive.

Accordingly, the manufacturing method makes it possible to form the external terminal electrodes only on an end surface of the elementary body easily and without fail.

Since the external electrode sheets that are to form the external terminal electrodes are laminated or integrated with the elementary material sheets which form the elementary body, the manufacturing method is capable of integrating the elementary body with the external terminal electrodes more securely than the conventional method, which coats or forms external terminal electrodes after calcining a laminated body. Accordingly, the manufacturing method according to the present invention makes it possible to enhance adhesion between external terminal electrodes and an elementary body and reduces voids produced.

Furthermore, the manufacturing method according to the present invention reduces floating capacities between the external terminal electrodes and the internal conductors since it forms the external terminal electrodes only on the end surfaces of the elementary body, or forms no external terminal electrode on the side surfaces of the elementary body. Accordingly, the manufacturing method according to the present invention facilitates preestimation of variations in capacitance caused by design modifications when a capacitor is to be formed as an electronic element in the elementary body, and shifts the resonance frequency toward a higher level when an inductor is to be formed as an electronic element, thereby making the electronic part usable within a frequency region higher than that of a conventional inductor.

Moreover, the manufacturing method according to the present invention permits omitting all the conventional steps to form external terminal electrodes, thereby making it possible to reduce investment in manufacturing processes and to shorten the time required for manufacturing a product.

In addition, the manufacturing method according to the present invention that forms the external electrodes only on the end surfaces of the elementary body lessens solder protuberances on the external terminal electrodes in the mounting stage, thereby allowing intervals between the conductive patterns to be narrowed on a circuit board at the mounting stage and providing a useful technique for configuring electronic appliances more compactly.

Furthermore, the manufacturing method for a laminated chip electronic part according to the present invention is a method for manufacturing a laminated chip electronic part comprising a laminated elementary body with internal conductors to form an electronic element, external terminal electrodes formed on either of the end surfaces of the elementary body corresponding to an upper layer and a lower layer in the laminated structure of the elementary body, and terminals for the electronic element which are connected to the external terminal electrodes, wherein the manufacturing method comprises a step to laminate a plurality of elementary body sheets with internal conductors to compose an electronic element formed on the surfaces thereof, a step to laminate external electrode sheets composed of insulating sheets with one or more conductors for external electrodes formed on a surface thereof and connecting via holes with at least either an uppermost layer or a lowermost layer of the laminated elementary body sheets so as to expose the entire surfaces of the conductors for the external electrodes, and a step to calcine the laminated body composed by laminating the laminated body sheets and the external electrode sheet. Upon termination of the calcination, the conductors for external electrodes form external terminal electrodes on a laminated part manufactured by the manufacturing method.

This manufacturing method for a laminated chip electronic part forms an electronic element such as a capacitor or a inductor with internal conductors formed on the elementary body sheets by laminating the plurality of elementary body sheets and connects the terminals of the electronic element to the conductors for external electrodes formed on the external electrode sheets by way of via holes or the like.

Further, the external terminal electrodes are formed with the conductors for the external electrodes formed on the external electrode sheets upon calcining the laminated body. The conductors for external electrodes formed on the surfaces of the external electrode sheets make it possible to form the external terminal electrodes only on the end surfaces.

Accordingly, the manufacturing method described above permits forming the external terminal electrodes only on the end surfaces of the elementary body easily and without fail. Since the external electrode sheets that have the conductors formed on the surfaces thereof to form the external terminal electrodes are laminated or integrated with the elementary body sheets which are to form the elementary body, the manufacturing method is capable of integrating the elementary body with the external terminal electrodes more securely than the conventional method, which coats or forms the external terminal electrodes after calcining the laminated body, thereby making it possible to enhance adhesion between the external terminal electrodes and the elementary body, and reduce production of voids and the like.

Furthermore, the manufacturing method that forms the external terminal electrodes only on the end surfaces of the elementary body, or forms no external terminal electrodes on side surfaces of the elementary body, reduces floating capacities between the external terminal electrodes and the internal conductors, thereby facilitating preestimation of variations in capacitance caused by design modification when a capacitor is to be formed as an electronic element in the elementary body or shifting the resonance frequency toward a higher level and making a part usable within a frequency region higher than that of the conventional inductor when an inductor is to be formed as an electronic element in the elementary body.

Moreover, this manufacturing method permits omitting all the conventional steps used to form the external terminal electrodes, thereby making it possible to reduce investment in manufacturing lines and to shorten the time required for manufacturing a product.

In addition, the manufacturing method that forms the external electrodes only on the end surfaces of the elementary body lessens solder protuberances on the external terminal electrodes in the mounting stage, thereby making it possible to allow intervals between conductor patterns to be narrowed on a circuit board and providing a technique useful for configuring electronic appliances more compactly.

Furthermore, the manufacturing method for a laminated chip electronic part according to the present invention is a manufacturing method for a laminated chip electronic part comprising a laminated elementary body with conductors to compose an electronic element, external terminal electrodes formed on at least either of the end surfaces of the elementary body corresponding to an upper layer or a lower layer in the laminated structure of the elementary body, and terminals of the electronic element that are connected to the external terminal electrodes, wherein the manufacturing method comprises a step to laminate a plurality of elementary body sheets composed of insulating material sheets having internal conductors formed on surfaces thereof, a step to form a laminated body by laminating the elementary body sheets, a step to print conductors for external electrodes in a conductive paste onto at least either of the uppermost surface and the lowermost surface of the laminated body, and a step to calcine the laminated body which has the conductors for external electrodes printed on the end surfaces thereof. Upon completing the calcination, the conductors for external electrodes form external terminal electrodes on a laminated part manufactured by the manufacturing method.

This manufacturing method for a laminated chip electronic part forms an electronic element such as a capacitor or an inductor with the internal conductors formed on the elementary body sheets by laminating a plurality of elementary body sheets so as to form the laminated body.

This manufacturing method conductively connects the terminals of the electronic element to the conductors for external electrodes by way of via holes or the like by printing the conductors for external electrodes in a conductive paste onto at least either of the uppermost surface and the lowermost surface of the laminated body.

Furthermore, the conductors for external terminal electrodes form the external terminal electrodes upon calcination of the laminated body. Since the conductors for external electrodes are formed on at least either of the uppermost surface or the lowermost surface of the laminated body, it is possible to form the external terminal electrodes only on the end surfaces.

Accordingly, the manufacturing method described above makes it possible to form the external terminal electrodes only on the end surfaces of the elementary body easily and without fail.

Since the manufacturing method calcines the laminated body after the conductor paste to form the external terminal electrodes is printed on the end surfaces of the laminated elementary body sheets, it is capable of integrating the elementary body with the external terminal electrodes more securely than the conventional laminated body on which external terminals are coated or formed after the laminated body is calcined. Accordingly, the manufacturing method is capable of enhancing adhesion between the external terminal electrodes and the elementary body and reducing production of voids.

Since the manufacturing method forms the external terminal electrodes only on the end surfaces, or forms no external terminal electrode on the side surfaces of the elementary body, it reduces floating capacities between the external terminal electrodes and the internal conductors, thereby facilitating preestimation of variations in capacitance caused by design modification, for example when a capacitor is to be formed as an electronic element in the elementary body or shifting a resonance frequency to a higher level and making an electronic part usable within a frequency region higher than conventional when an inductor is to be formed as an electronic element in elementary body.

Moreover, the manufacturing method permits omitting all the conventional steps used to form external electrodes, thereby making it possible to reduce investment in manufacturing lines and shorten the time required for manufacturing a product.

In addition, the manufacturing method that forms the external electrodes only on the end surfaces of the elementary body reduces protuberances of solder on the external terminal electrodes, thereby allowing intervals between conductor patterns on a circuit board and providing a useful means for making electronic appliances more compact.

BRIEF DESCRIPTION OF THE DRAWINGS

FIG. 3 is a plan sectional view illustrating a conventional vertical laminated type chip capacitor;

FIG. 4 is a side sectional view illustrating a conventional horizontal laminated type chip inductor;

FIG. 9 a diagram illustrating results of comparison of capacitances between the first embodiment of the present invention and the conventional example;

FIG. 10 is a diagram illustrating measurement results of a second embodiment of the laminated chip capacitor according to the present invention;

FIG. 22 is a condition of the third embodiment of the vertical laminated type chip capacitor according to the present invention when it is mounted on a circuit board;

FIG. 23 is a plan sectional view illustrating a fourth embodiment of the vertical laminated type chip inductor according to the present invention;

DETAILED DESCRIPTION OF THE PREFERRED EMBODIMENTS

This invention will be described in further detail by way of example with reference to the accompanying drawings.

Figure 1:
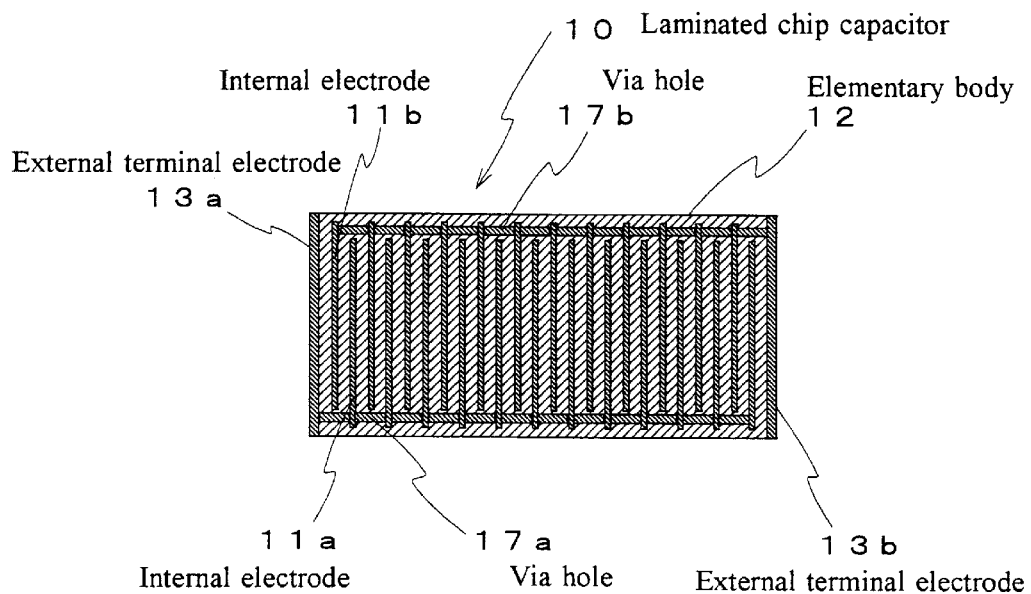
FIG. 1 is a plan sectional view illustrating a first embodiment of the vertical laminated type chip capacitor according to the present invention.
Figure 2:
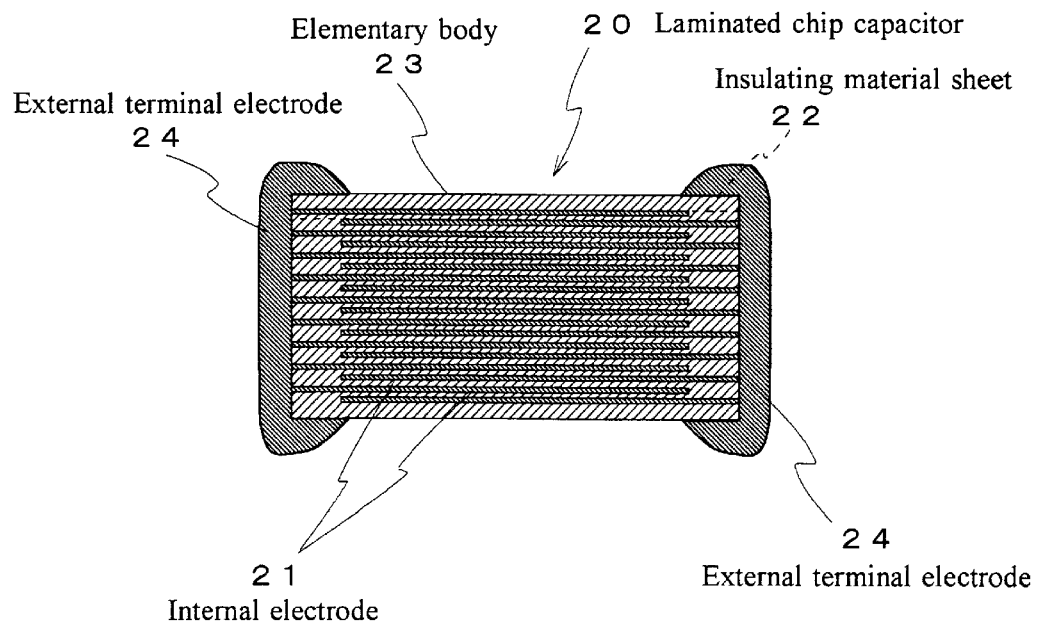
FIG. 2 is a side sectional view illustrating a conventional horizontal laminated type chip capacitor.
Figure 6:
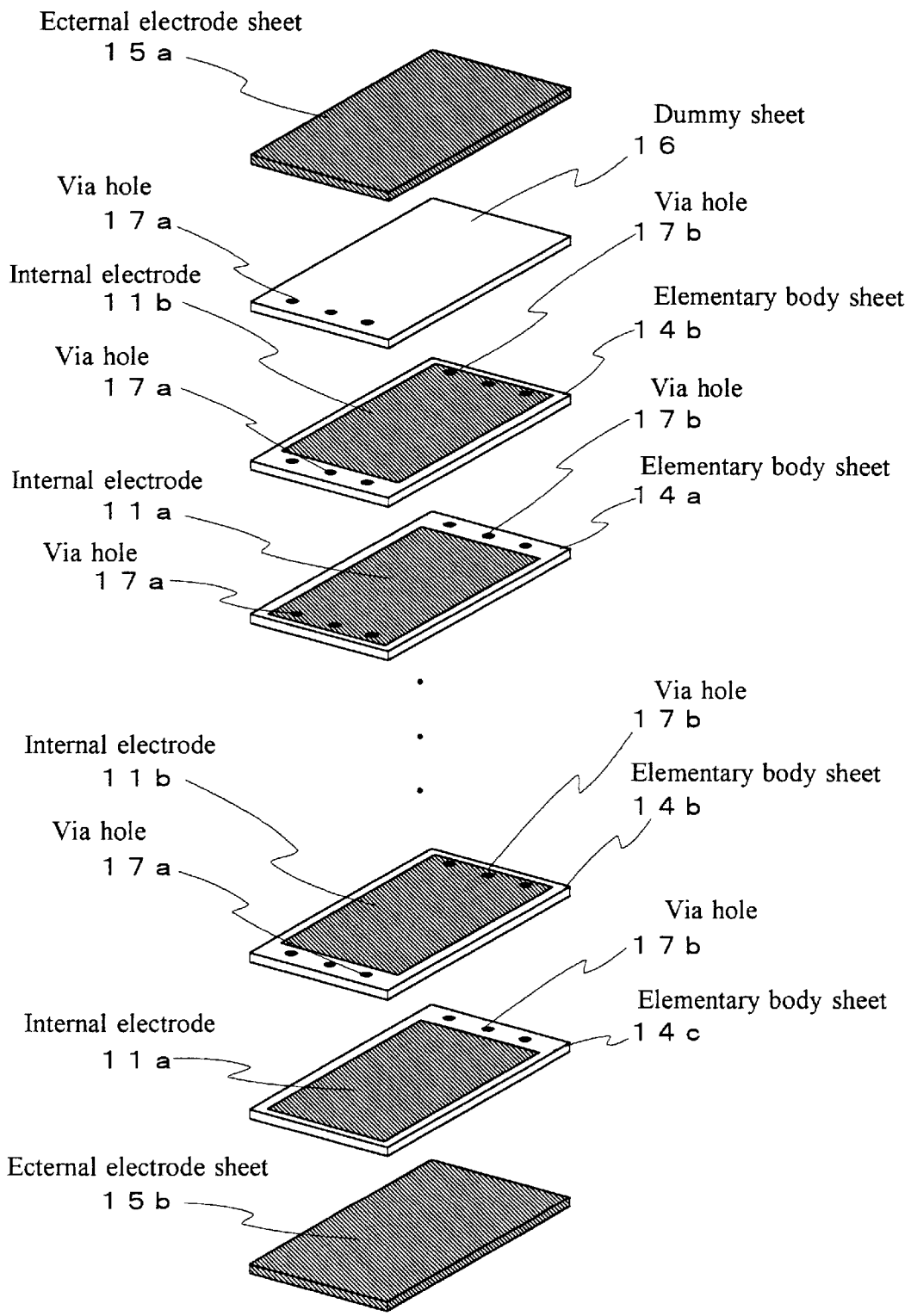
FIG. 6 is an exploded perspective view of a first embodiment of a vertical laminated type chip capacitor according to the present invention.

FIG. 1 is a plan sectional view illustrating a first embodiment of the vertical laminated type chip capacitor according to the present invention and FIG. 6 is an exploded perspective view of the first embodiment.

In FIGS. 1 and 6, a reference numeral 10 represents a laminated chip capacitor composed of an elementary body 12 which has a plurality of internal electrodes 11a and 11b parallel to each other, and external terminal electrodes 13a and 13b that are formed so as to be parallel to the surfaces of the internal electrodes on two end surfaces of the elementary body 12 opposed to each other.

The elementary body 12 is formed by laminating elementary body sheets 14a and 14b which have internal electrodes 11a and 11b formed on the surfaces thereof, and are made of an insulating material, external electrode sheets 15a and 15b which are made of a conductive material, and a dummy sheet 16 which is made of an insulating material as shown in FIG. 6. Each of the sheets 14a, 14b, 15a, 15b and 16 is a rectangular sheet 50 μm thick.

These sheets are laminated in the order of: the external electrode sheet 15b as the lowermost layer, the elementary body sheet 14c on the external electrode sheet 15b, a predetermined number of the elementary body sheets 14b and 14a laminated alternately, and the dummy sheet 16 and the external electrode sheet 15a thereover.

The internal electrodes 11a and 11b are formed on the elementary body sheets 14a and 14b with predetermined margins reserved from edges of the sheets so that the internal electrodes are not exposed on the side surfaces of the elementary body. Furthermore, adjacent pairs of the internal electrodes 11a and 11b are formed so as to be slightly deviated from each other in the longitudinal direction of the sheets. Formed in the elementary body sheets 14a, 14b and the dummy sheet 16 are via holes 17a that serve to conductively connect a plurality of internal electrodes 11a to the external electrode sheet 15a and via holes 17b that serves to conductively connect a plurality of internal electrodes 11b to the external electrode sheet 15b.

The laminated chip capacitor described above was manufactured as described below:

First a ceramic slurry was prepared by adding 10% by weight of polyvinylbutyral (PVB) and 50% by weight of solvent to 100% by weight of bariumtitanate. After agitating the ceramic slurry with a ball mill for 15 hours, green sheets (elementary body sheets 14a, 14b and 14c) 50 μm thick were obtained by the doctor blade method.

Furthermore, green sheets (external electrode sheets 15a and 15b) 50 μm thick were obtained by adding 12% by weight of PVB, 5% by weight of a glass frit and 50% by weight of a solvent to 100% by weight of silver powder, and treating the slurry thus obtained by procedures similar to those for the elementary body sheets.

After boring (forming the via holes) the elementary body sheets 14a, 14b, 14c formed as described above, the internal electrodes 11a and 11b were printed using a conductive paste, and the green sheets were treated through steps similar to those for the ordinary vertical laminated type chip prior to calcination.

Speaking concretely, the elementary body sheets 14a, 14b, 14c, the external electrode sheets 15a, 15b and the dummy sheet 16 were laminated in the order described above, brought into contact and bonded under pressure, cut into individual chips, treated to eliminate binder, and calcined.

Laminated chip capacitors were completed through the treatments up to this step.

The external electrode sheets 15a and 15b may be plated as occasion demands.

In this case, a plurality of laminated chip capacitors were manufactured at one time by forming internal electrodes and via holes corresponding to a plurality of chips in a matrix in a single sheet and cutting it after laminated.

Since the manufacturing method forms the external terminal electrodes 13a and 13b with the external electrode sheets 15a and 15b themselves, it is capable of forming the external terminal electrodes 13a and 13b extremely easily only on the two end surfaces of the elementary body 12 that are opposed to each other.

Furthermore, since the manufacturing method forms the external terminal electrodes 13a and 13b with the external electrode sheets 15a and 15b that are made of a conductive material, the external terminal sheets 13a and 13b have the property of being integrated with the elementary body 12 more securely than the conventional external terminal electrodes, which are formed by coating a conductive paste after calcining a chip, whereby the manufacturing method enhances adhesion to the elementary body 12 and lessens the problem of having voids, etc. produced.

Furthermore, since the manufacturing method forms no external terminal electrodes on the side surfaces of the elementary body 12, it reduces floating capacitances formed between the external terminal electrodes 13a, 13b and the internal electrodes 11a, 11b, thereby facilitating pre-estimation of variation in capacitances caused by design modification.

Furthermore, since the manufacturing method permits omitting all the conventional steps to form the external terminal electrodes, i.e., a step to coat conductive paste onto a calcined chip and a step to bake the external terminal electrodes, the method makes it possible to reduce investment in manufacturing equipment and shorten the time required for manufacturing a product.

Figure 7:
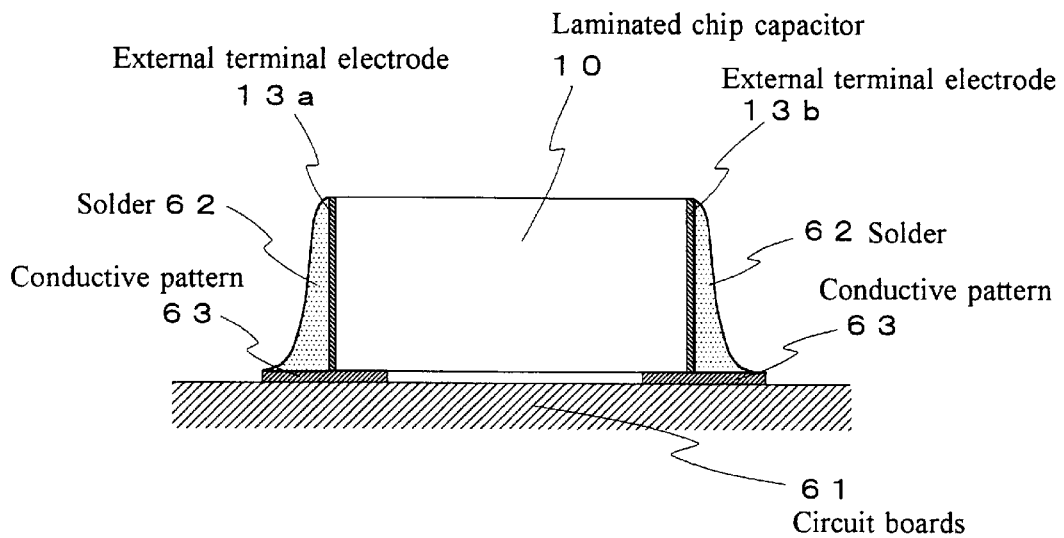
FIG. 7 is a diagram illustrating a condition of the first embodiment of the laminated chip capacitor according to the present invention when it is mounted on a circuit board.

Moreover, since the manufacturing method forms the external terminal electrodes 13a, 13b only on the end surface of the elementary body 12, it lowers protuberances of solder 62 on the external terminal electrodes 13a and 13b during mounting of the laminated chip capacitor 10 on a circuit board 61 or the like as shown in FIG. 7. Accordingly, the manufacturing method makes it possible to narrow the intervals between printed wiring lines formed on a circuit board 61 and conductive patterns 63 such as lands, thereby being usable as a technique useful for configuring electronic appliances more compactly.

Figure 8:
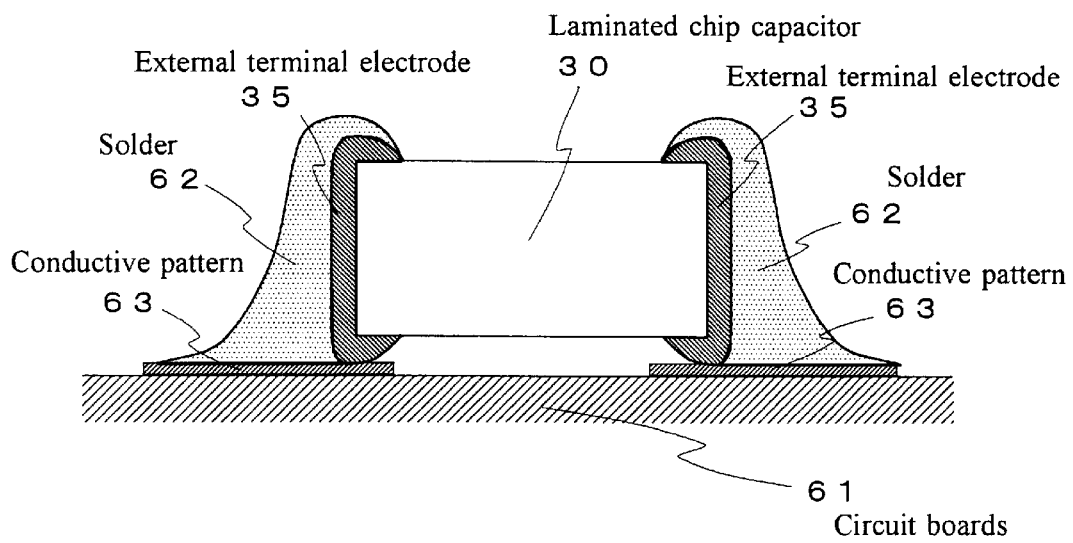
FIG. 8 is a diagram illustrating a condition of the conventional laminated chip capacitor when it is mounted on a circuit board.
Figure 11:
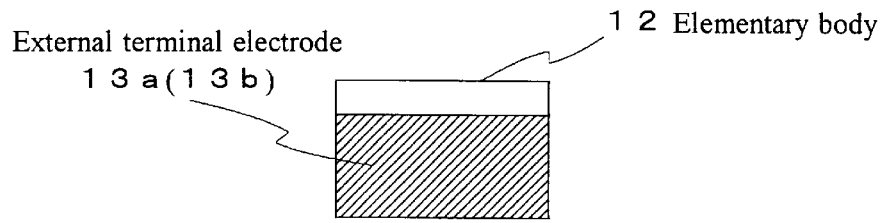
FIG. 11 is a diagram illustrating a form of another external terminal electrode according to the present invention.
Figure 12:
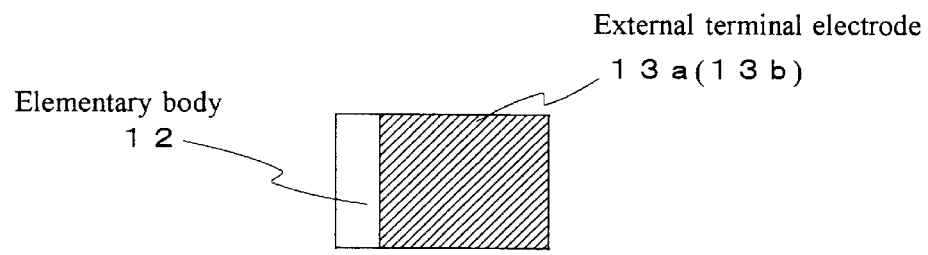
FIG. 12 is a diagram illustrating a form of still another external terminal electrode according to the present invention.
Figure 13:
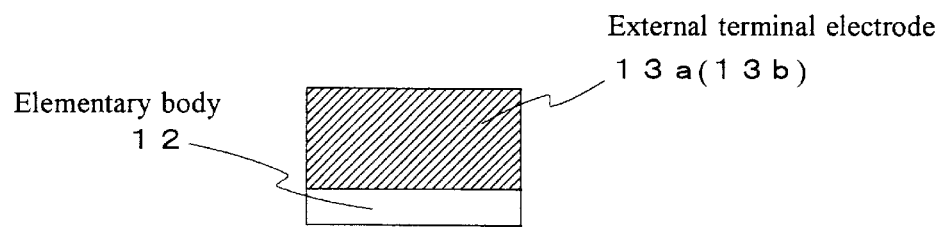
FIG. 13 is a diagram illustrating a form of still another external terminal electrode according to the present invention.
Figure 14:
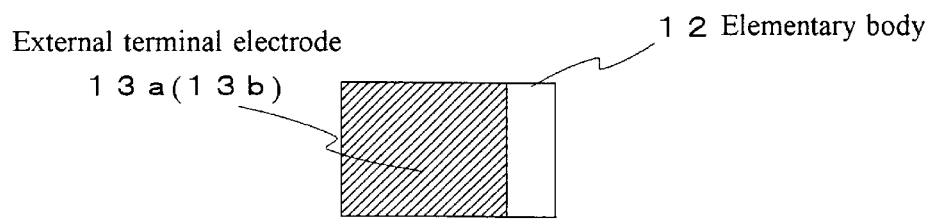
FIG. 14. is a diagram illustrating a form of still another external terminal electrode according to the present invention.
Figure 15:
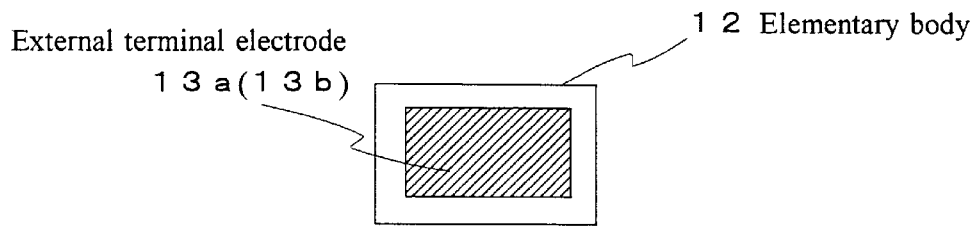
FIG. 15 is a diagram illustrating a form of another external terminal electrode according to the present invention.
Figure 16:
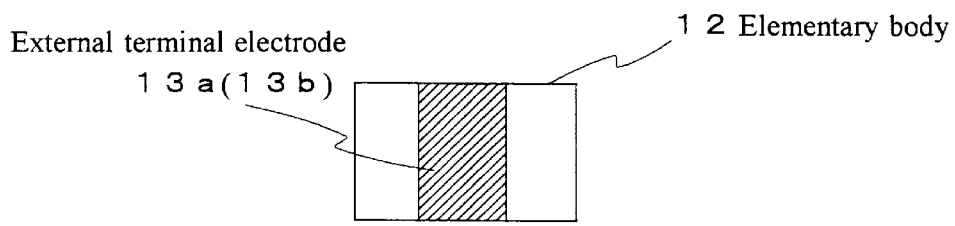
FIG. 16 is a diagram illustrating a form of another external terminal electrode according to the present invention.
Figure 17:
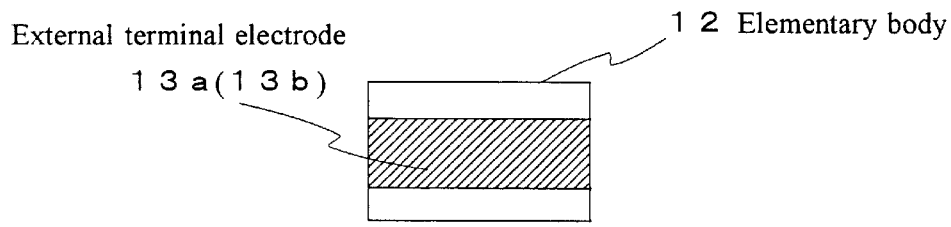
FIG. 17 is a diagram illustrating a form of another external terminal electrode according to the present invention.
Figure 18:
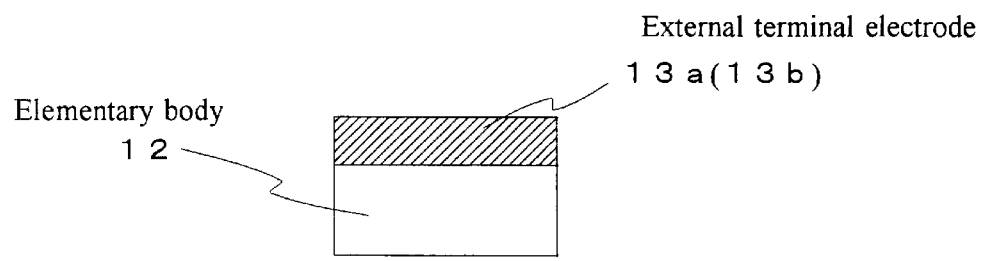
FIG. 18 is a diagram illustrating a form of another external terminal electrode according to the present invention.
Figure 19:
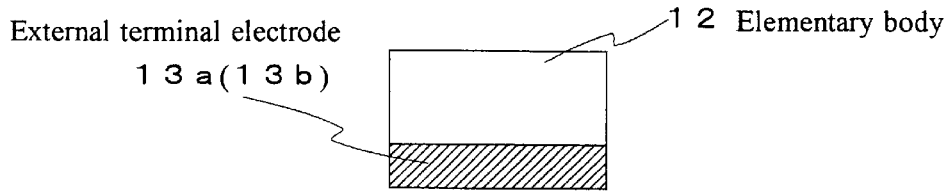
FIG. 19 is a diagram illustrating a form of another external terminal electrode according to the present invention.
Figure 20:
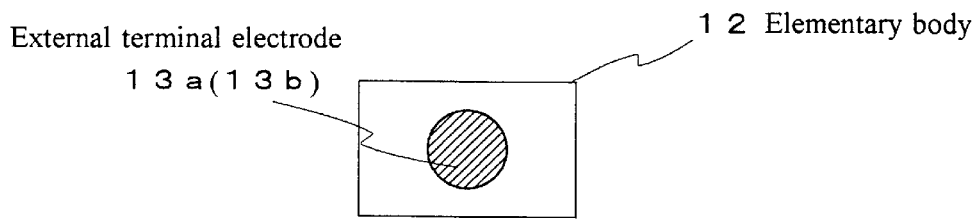
FIG. 20 is a diagram illustrating a form of another external terminal electrode according to the present invention.

FIG. 8, which shows a condition of a laminated type chip capacitor 30 (shown in FIG. 3) selected as a conventional example mounted on a circuit board 61, clarifies a difference from the embodiment of the present invention illustrated in FIG. 7.

Description will now be made of the results obtained by comparing the laminated type chip capacitors manufactured by the method described above with the laminated type chip capacitors manufactured as conventional examples (having the structure shown in FIG. 3).

The vertical laminated type chip capacitor preferred as the first embodiment and the vertical laminated type chip capacitor selected as the conventional example were manufactured respectively in five groups each consisting of 100 chip capacitors: chip capacitors belonging to different groups having 5, 10, 15, 20 and 25 internal electrode layers respectively. Average values of capacitance of these laminated chip capacitors were calculated, and compared with theoretical values Comparison results are summarized in FIG. 9.

In FIG. 9, the ordinate corresponds to capacitance values, the abscissa corresponds to numbers of internal electrode layers, curve A expresses the average values of measured capacities of the chip capacitors manufactured by the embodiment of the present invention, a curve B traces the average values of the chip capacitors manufactured by the conventional example and curve C presents the theoretical values.

Curve A, which expresses the capacities of the chip capacitors manufactured by the embodiment of the present invention indicates 1.6 nF for 5 internal electrode layers, 3.3 nF for 10 layers, 5.2 nF for 15 layers, 7.1 nF for 20 layers and 10.0 nF for 25 layers, whereas curve B, which traces the chip capacitors manufactured by the conventional example, indicates 3.0 nF for 5 internal electrode layers, 4.1 nF for 10 layers, 5.5 nF for 15 layers, 7.2 nF for 20 layers and 10.1 nF for 25 layers.

Furthermore, the theoretical values are 1.2 nF for 5 internal electrode layers, 3.1 nF for 10 layers, 5.1 nF for 15 layers, 7.1 nF got 20 layers and 10.0 nF for 25 layers.

As is apparent from these comparison results, the laminated chip capacitors manufactured by the embodiment of the present invention have capacities which are substantially coincident with the theoretical values, that is, floating capacities have been reduced from those of the chip capacitors manufactured by the conventional example.

Now, a description will be given of a second embodiment of the present invention.

In the second embodiment, external terminal electrodes were formed by the printing method for manufacturing a vertical laminated type chip capacitor similar to that obtained in the first embodiment. In other words, in the second embodiment a laminated chip capacitor having a plan section which is the same as that shown in FIG. 1 was manufactured by a different method.

In the second embodiment, a vertical laminated type chip capacitor was manufactured as described below:

First, a ceramic slurry was prepared by adding 10% by weight of polyvinylbutyral (PVB) and 50% by weight of a solvent to 100% by weight of bariumtitanate. After agitating the ceramic slurry for 15 hours with a ball mill, green sheets (elementary sheets 14a, 14b and 14c) 50 μm thick were obtained by the doctor blade method.

Further, an external electrode printing paste was prepared by adding 15% by weight of ethyl cellulose, 5% by weight of glass frit and 20% by weight of a solvent to 100% by weight of silver powder, and dispersing a slurry thus obtained with a three-roll mill for five hours.

After boring the elementary body sheets 14a, 14b and 14c thus formed(forming via holes), internal electrodes 11a and 11b were printed using a conductive paste, and the elementary body sheets 14a, 14b, 14c and a dummy sheet 16 were laminated and bonded under pressure, thereby forming a laminated body.

Then, the external electrode printing paste was printed over the entire end surfaces of the uppermost layer and a lowermost layer of the laminated body. This printing was performed by the screen printing method. A printing process which forms a film 20 μm thick was repeated five times to coat the external electrode paste 100 μm thick in total on an end surface.

Then, the laminated body printed with the external electrode paste was cut into individual chips, treated to eliminate binder, and calcined. Laminated chip capacitors were completed through the processes up to this step.

In addition, the external terminal electrodes 13a and 13b may be plated as occasion demands.

In the second embodiment, a plurality of laminated chip capacitors were manufactured at one time by forming the internal electrodes and via holes corresponding to a plurality of chips in a matrix in a single sheet and cutting the sheet after laminated.

Now, a description will be given of the measured results of capacitance values of the vertical laminated type chip capacitors which were manufactured by the method described above.

In the second embodiment, the laminated chip capacitors were manufactured in five groups each consisting of 100 chip capacitors: chip capacitors belonging to different groups having 5, 10, 15, 20 and 25 internal electrode layers as in the first embodiment. Average values of capacities of these chip capacitors were calculated. Measured results are shown in FIG. 10. In FIG. 10, the ordinate corresponds to capacity values and the abscissa corresponds to numbers of internal electrode layers.

The measured results indicate 1.8 nF for 5 internal electrode layers, 3.5 nF for 10 layers, 5.5 nF for 15 layers, 7.1 nF for 20 layers and 10.0 nF for 25 layers, which are substantially the same as those obtained in the first embodiment.

The manufacturing method preferred as the second embodiment described above also makes it possible to form the external terminal electrodes 13a and 13b extremely easily only on the two end surfaces of the elementary body 12 which are opposed to each other, to integrate the external terminal electrodes 13a and 13b with the elementary body 12 more securely than the conventional external terminal electrodes, which are formed by coating a conductive paste after calcining a chip, to enhance adhesion to the elementary body 12 and to lessen the problem of allowing voids, etc. to be formed.

Since the manufacturing method forms no external terminal electrodes on the side surfaces of the elementary body 12, it reduces floating capacities to be produced between the external terminal electrodes 13a, 13b and the internal electrodes 11a, 11b, thereby facilitating to preestimate a variation of a capacity value to be caused by a design modification.

Furthermore, since the manufacturing method makes protuberance of solder in the external electrodes 13a, 13b lower than that in the conventional example at the stage of mounting the laminated chip capacitor 10 on a circuit board or the like, it makes it possible to narrow intervals between printed wiring lines, lands and the like, thereby providing a useful means for configuring electronic appliances more compactly.

Though the second embodiment is configured to print the external electrode paste on the laminated body after it is formed, it is possible to laminate insulating material sheets that have the via holes formed therein and the external electrode coated thereto, like the elementary sheets 14a, 14b and 14c, together with the elementary sheets 14a, 14b and 14c so that the surfaces on which the external electrode paste is printed form end surfaces, bond the sheets under pressure, cut the sheets into individual chips, treat them to eliminate binder and then calcine the chips.

Though the external terminal electrodes 13a and 13b are generally formed on the end surfaces of the chip so as to cover the end surfaces entirely, it is not limited to this form. It is possible to modify the form of the external terminal electrodes 13a and 13b depending on the purpose of use, as shown in FIGS. 11 through 20. For such modifications, it is possible to easily obtain desired forms by forming cuts in the external electrode sheets in the first embodiment or forming screen patterns matched to the a purpose in the second embodiment.

Though the first embodiment and the second embodiment have been described based on fundamental premises of the sheet method and the screen printing method, it has been confirmed that the present invention is applicable quite similarly also to the slurry build method to actually obtain similar effects.

Now, description will be made of a third embodiment of the present invention.

Figure 21:
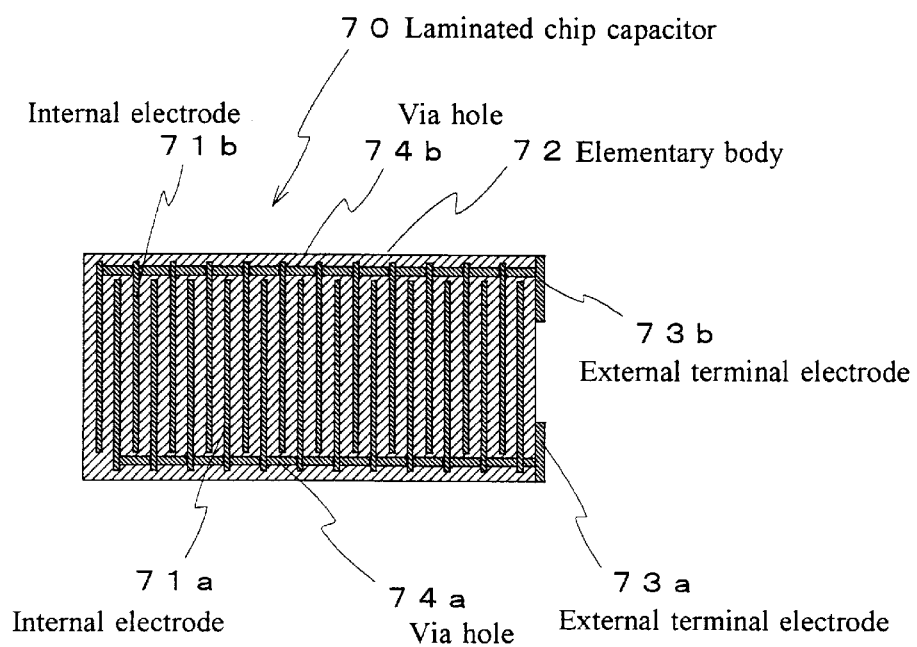
FIG. 21 is a plan sectional view illustrating a third embodiment of the vertical laminated type chip capacitor according to the present invention.
Figure 2:
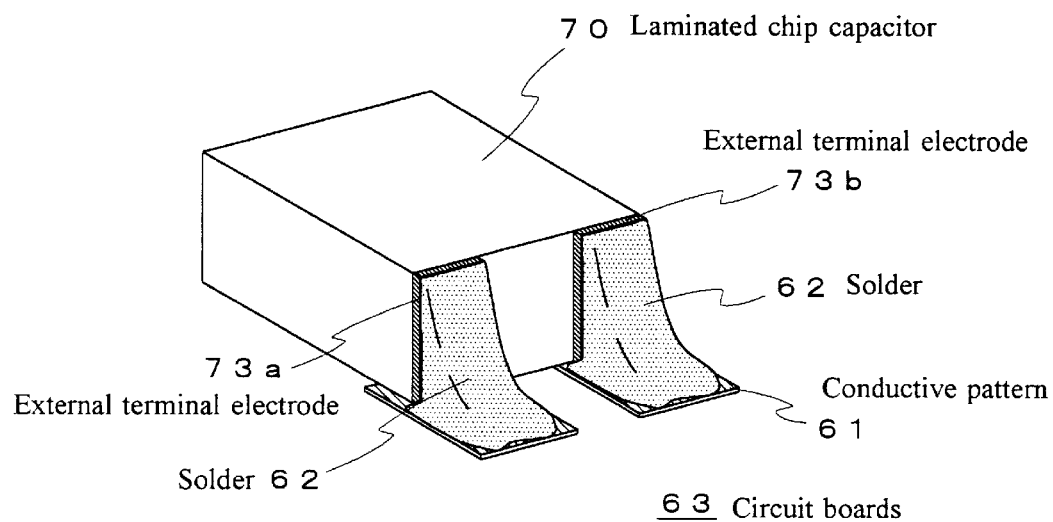
Figure 2:
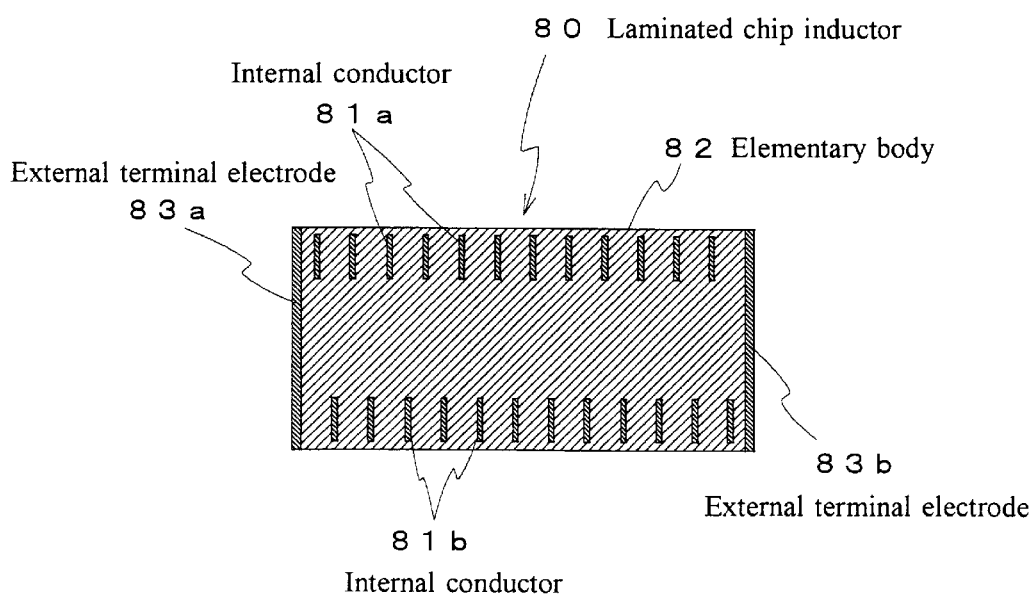

FIG. 21 is a plan sectional view illustrating a vertical laminated type chip capacitor preferred as a third embodiment. In the third embodiment, external terminal electrodes are formed at locations that are different from those in the first and second embodiments, that is, two different external terminal electrodes are formed on one end surface of the elementary body as shown in FIG. 21.

In FIG. 21, reference numeral 70 represents a vertical laminated type chip capacitor. A plurality of internal electrodes 71a and 71b are arranged at predetermined intervals in an elementary body 72, and two external terminal electrodes 73a and 73b are formed on an end surface of the elementary body 72 so as to be parallel to the surfaces of the internal electrodes 71a and 71b. Further, the external terminal electrode 73a is conductively connected to a plurality of internal electrodes 71a by way of via holes 74a, whereas the other external terminal electrode 73b is conductively connected to a plurality of internal electrodes 71b by way of via holes 74b.

The laminated chip capacitor having this structure is manufactured by a method which is similar to the manufacturing method for the second embodiment described above. The third embodiment is different from the second embodiment only in elementary body sheets, locations of the via holes in the dummy sheet and printed locations for the external electrode paste.

The third embodiment also provides effects which are the same as those of the second embodiment. Since the laminated chip capacitor 70 in the third embodiment is mounted on a circuit board as shown in FIG. 22, it requires a mounting space that is smaller than that for the first embodiment or the second embodiment, thereby making it possible to configure electronic appliances more compactly.

Now, a fourth embodiment of the present invention will be described.

In the fourth embodiment, the manufacturing method of the first embodiment described above is applied to the manufacturing of a vertical laminated type chip inductor.

Figure 24:
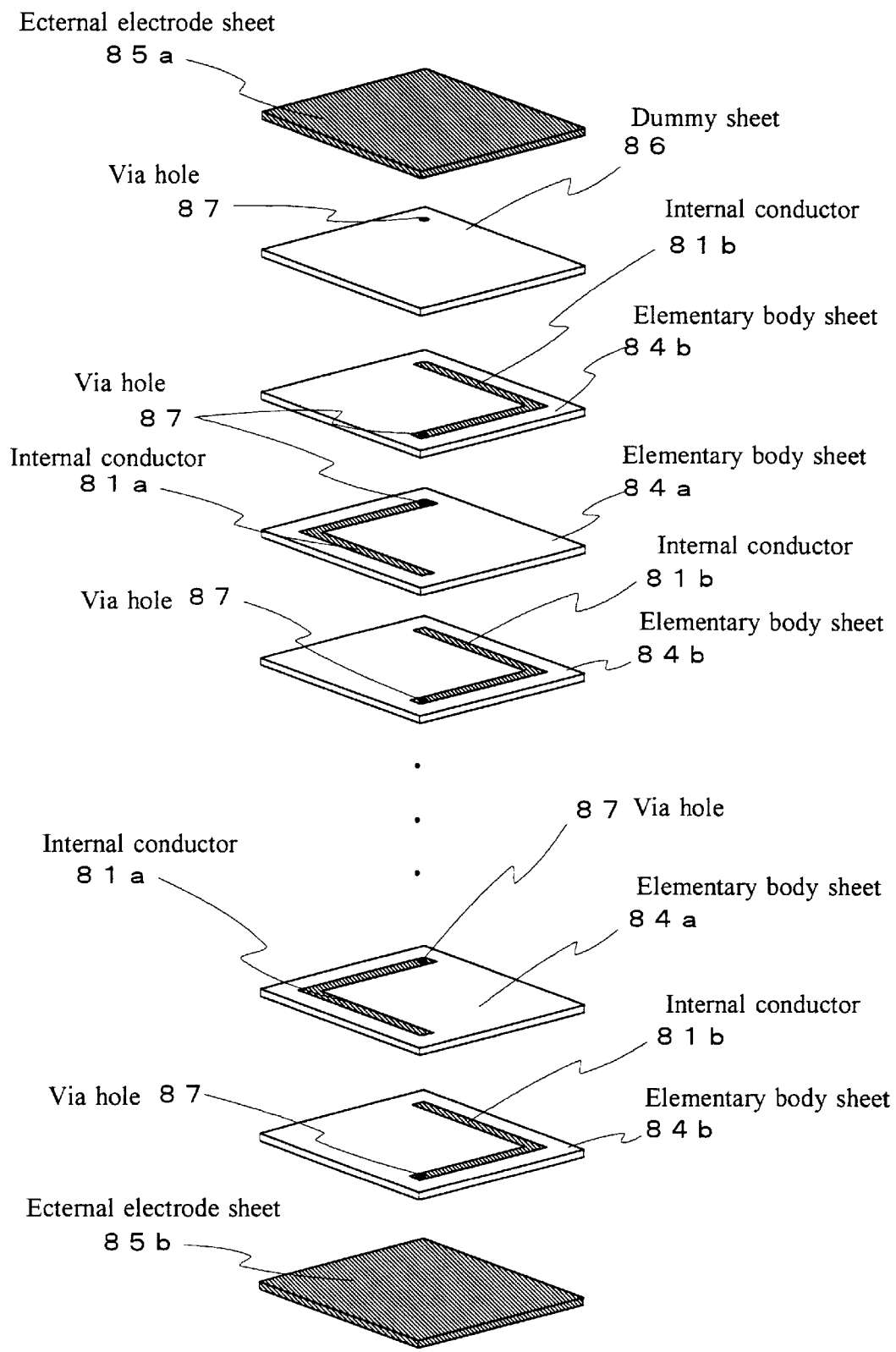
FIG. 24 is an exploded perspective view illustrating the fourth embodiment of the vertical laminated type chip inductor according to the present invention.

FIG. 23 is a plan sectional view illustrating a vertical laminated type chip inductor preferred as the fourth embodiment and FIG. 24 is an exploded perspective view of the forth embodiment. In FIGS. 23 and 24, reference numeral 80 represents a laminated chip inductor composed of an elementary body 82 which has a plurality of L-shaped internal conductors 81a and 81b, and external terminal electrodes 83a and 83b which are formed so as to be parallel to the surfaces of the internal conductors on two end surfaces of the elementary body 82 opposed to each other.

The elementary body 82 is composed by laminating elementary body sheets 84a and 84b that have internal conductors 81a and 81b formed on the surfaces thereof, and made of an insulating material, external electrode sheets 85a and 85b which are made of a conductive material, and a dummy sheet 86 which is made of an insulating material as shown in FIG. 24. Each of the sheets 84a, 84b, 85a, 85b and 86 is a square sheet 50 $\mu$m thick.

These sheets are laminated in the order of: the external electrode sheet 85b as the lowermost layer, the elementary body sheets 84b and 84a laminated alternately over the external electrode sheet 85b, and the dummy sheet 86 and the external electrode sheet 85a laminated over the elementary body sheets as shown in FIG. 24.

The internal conductors 81a and 81b which are formed on the elementary body sheets 84a and 84b are conductively connected spirally to each other by way of via holes 87. Furthermore, the ends of the internal conductors 81*a* and 81*b* which are spirally connected are conductively connected to the external terminal sheets 85*a* and 85*b* by way of via holes 87 formed in the elementary body sheet 84*b* disposed as the lowermost layer and the dummy sheet 86.

The laminated chip inductor 80 described above was manufactured as described below:

First, a ceramic slurry was prepared by adding 10% by weight of polyvinylbutyral (PVB) and 50% by weight of a solvent to 100% by weight of ferrite material. After agitating the slurry with a ball mill for 15 hours, green sheets 50 $\mu$m thick (elementary body sheets 84*a* and 84*b*) were manufactured by the doctor blade method.

Further, green sheets (external electrode sheets 85*a* and 85*b*) 50 $\mu$m thick were manufactured by adding 12% by weight of PVB, 5% by weight of glass frit and 50% by weight of a solvent to 100% by weight of silver powder, and treating the slurry thus obtained in procedures similar to those for manufacturing the elementary body sheets.

After boring the elementary body sheets manufactured as described above (formation of via holes), internal conductors 81*a* and 81*b* were printed using a conductive paste and the sheets were treated through the steps to the calcination for manufacturing an ordinary vertical laminated type chip.

Speaking concretely, the elementary body sheets 84*a*, 84*b*, the external electrode sheets 85*a*, 85*b* and the dummy sheet 86 were laminated in the order described above, bonded under pressure, cut into individual chips, treated to eliminate binder and calcined.

A laminated chip inductor 80 is completed through the treatments up to this step.

The external electrode sheets 85*a* and 85*b* are plated as occasion demands.

In this embodiment, a plurality of chip inductors manufactured by forming internal conductors and via holes corresponding to a plurality of chips were formed in each of the sheets in a matrix, laminating the sheets and cutting them after laminated.

Since the manufacturing method described above allows the external electrode sheets 85*a* and 85*b* to form the external terminal electrodes 83*a* and 83*b* by themselves, the method makes it possible to form the external terminal electrodes 83*a* and 83*b* extremely easily only on the end surfaces of the elementary body 82, which are opposed to each other.

Furthermore, since the manufacturing method forms the external terminal electrodes 83*a* and 83*b* with the external electrode sheets 85*a* and 85*b* which are made of a conductive material, the method gives the external terminal electrode 83*a* and 83*b* the property to adhere to the elementary body 82 more securely than the conventional external terminals, which are formed by coating a conductive paste after calcining the chip, thereby enhancing adhesion to the elementary body 82 and lessening the problem of production voids, etc.

Furthermore, since the manufacturing method forms no external terminal electrodes on the side surfaces of the elementary body 82, the method reduces floating capacitances produced between the external terminal electrodes 83*a*, 83*b* and the internal conductors 81*a*, 81*b*, thereby shifting the resonance frequency $f_0$ a higher level and making the electronic part usable within a frequency region higher than is conventional.

Moreover, the manufacturing method permits omitting the conventional steps used to form external terminal electrodes, i.e., all the steps to coat a conductive paste on the calcined chip and to bake the conductive paste, thereby making it possible to reduce investment in manufacturing equipment and shorten the time required for manufacturing a product.

In addition, since the manufacturing method forms the external terminal electrodes 83*a* and 83*b* only on the end surfaces of the elementary body 82, the method provides a chip inductor which makes, like the laminated chip capacitor 10 described with reference to FIG. 7, protuberances of solder on the external terminal electrodes 83*a* and 83*b* lower than on the conventional example at the stage of mounting the laminated chip inductor 80 on a circuit board or the like, thereby narrowing the intervals between conductive patterns such as printed wiring lines and lands and providing a useful means to configuring electronic appliances more compactly.

Figure 5:
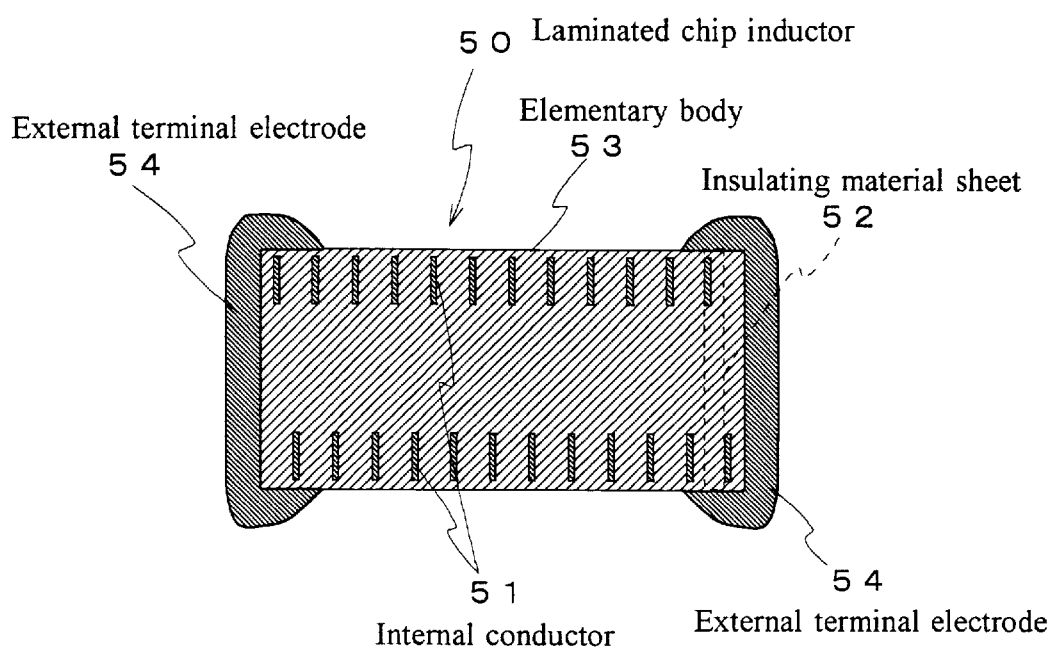
FIG. 5 is a side sectional view illustrating a conventional vertical laminated type chip inductor.

Now, a description will be given of results which were obtained by comparing a vertical laminated type chip inductor manufactured by the method described above with a conventional vertical laminated type chip inductor (shown in FIG. 5).

Chip inductors which were the same in dimensions and internal conductors but different in external terminal electrodes thereof were manufactured by the method of the fourth embodiment and the conventional method, and the inductance values and resonance frequencies of the chip inductors were measured.

The measurements indicated an inductance value of 0.466 $\mu$H and a resonance frequency of 172 MHz for the laminated chip inductor manufactured by the method of the fourth embodiment, and an inductance value of 0.468 $\mu$H and a resonance frequency of 149 MHz for the chip inductor manufactured by the conventional method.

Accordingly, the fourth embodiment is capable of providing a resonance frequency which is 10% or more higher than that of the conventional chip inductor, that is, an electronic part that is improved so as to cope with high frequencies.

Now, a description will be given of a fifth embodiment of the present invention.

In the fifth embodiment, a vertical laminated type chip inductor similar to the fourth embodiment was manufactured by applying the manufacturing method in the second embodiment.

In other words, the laminated chip inductor preferred as the fifth embodiment was the same in the plan section as that shown in FIG. 23 but different in the manufacturing method thereof.

In the fifth embodiment, a vertical laminated type chip inductor was manufactured as described below:

First, a ceramic slurry was prepared by adding 10% by weight of polyvinylbutyral (PVB) and 50% by weight of a solvent to 100% by weight of a ferrite material. After agitating the slurry with a ball mill for 15 hours, green sheets (elementary body sheets 84*a* and 84*b*) 50 $\mu$m thick were manufactured by the doctor blade method.

Furthermore, an external electrode printing paste was prepared by adding 15% by weight of ethyl cellulose, 5% by weight of glass frit and 20% by weight of a solvent to 100% by weight of silver powder, and dispersing the slurry thus obtained with a three-roll mill for five hours.

After boring the elementary sheets 84*a* and 84*b* (formation of via holes), internal conductors 81*a* and 81*b* were printed using a conductive paste, and the elementary body sheets 84*a*, 84*b* and a dummy sheet 86 were laminated and bonded under pressure, thereby forming a laminated body.

Then, the external electrode paste was printed on the entire end surfaces of the uppermost layer and lowermost layer of the laminated body. The printing was carried out by the screen printing method. A printing process to form a film 20 μm thick was repeated five times until a film of external electrode paste was 100 μm on the end surface.

Then, the laminated body on which the external electrode paste was printed was cut into individual chips treated to remove binder, and calcined.

Laminated chip inductors were completed through the processes up to this step.

The external terminal electrodes 83a and 83b are plated as occasion demands.

In the fifth embodiment, a plurality of laminated chip inductors were manufactured at one time by forming internal conductors and via holes corresponding to a plurality of chips in each of the sheets, in a matrix, laminating the sheets and cutting them.

A vertical laminated type chip inductor with specifications the same as those of the fourth embodiment was manufactured by the method described above, and its inductance value and resonance frequency were measured.

The measurements indicated an inductance value of 0.469 μH and a resonance frequency of 171 MHz. Accordingly, the fifth embodiment is also capable of providing a resonance frequency that is 10% or more higher than that of the conventional example and an electronic part which is improved to cope with high frequencies.

Needless to say, the fifth embodiment provides effects which are similar to those of the fourth embodiment.

Though the fourth and fifth embodiments have been described above based on the fundamental premises of the sheet method and the screen printing method, it has already been confirmed that the present invention is applicable quite similarly to the slurry build method with substantially the same effects.

Now, a description will be given of a sixth embodiment of the present invention.

Figure 25:
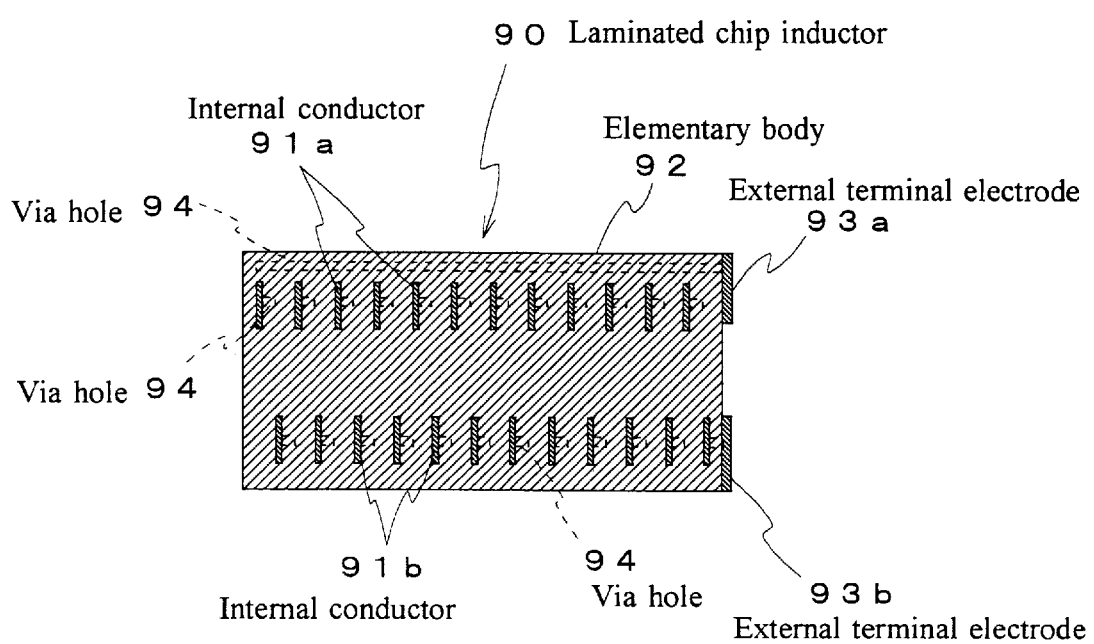
FIG. 25 a plan sectional view illustrating a sixth embodiment of the vertical laminated type chip inductor according to the present invention.

FIG. 25 is a plan sectional view referred to as sixth embodiment of a vertical laminated type chip inductor. In the sixth embodiment, two different external terminal electrodes are formed on opposite end surfaces of an elementary body at locations different from those in the fourth or fifth embodiment.

In FIG. 25, reference numeral 90 represents a vertical laminated type chip inductor composed of an elementary body 92 in which a plurality of L-shaped internal conductors 91a and 91b are arranged at predetermined intervals. Two external terminal elecrtrodes 93a and 93b are formed on an end surface of the elementary body 92 so as to be parallel to the internal conductors 91a and 91b.

Further, the internal conductors 91a and 91b are conductively connected spirally by way of via holes 94, and the ends of the spirally connected internal conductors 91a and 91b are conductively connected to the external terminal electrodes 93a and 93b by way of the via holes 94.

The laminated chip inductor having this structure is manufactured by a method which is similar to the manufacturing method used in the fifth embodiment described above, and is different only in the locations of via holes formed in elementary body sheets and the dummy sheet and in printing locations for external electrode paste.

Effects which are similar to those of the fifth embodiment can be obtained also in the sixth embodiment. Like the laminated chip capacitor shown in FIG. 22, the chip inductor 90 preferred as the sixth embodiment requires a space for mounting on a circuit board that is smaller than that for the fourth or fifth embodiment, thereby allowing one to configure electronic appliances more compactly.

Needless to say, the manufacturing methods adopted for the first through sixth embodiments are not limited to the manufacturing of capacitors and inductors, and are applicable only to laminated parts with laminated layer structure and are peculiar to manufacturing of vertically laminated layer structures.

The invention may be embodied in other specific forms without departing form the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of manufacturing a laminated chip electronic part including a laminated elementary body having internal conductors forming an electronic element, external terminal electrodes on at least one end surface corresponding to at least one of an upper layer and a lower layer in a laminated structure of said elementary body, and terminals of said electronic element which are connected to said external terminal electrodes, said manufacturing method comprising:

laminating a plurality of elementary body sheets composed of insulating material sheets which have internal conductors formed on surfaces thereof to form the electronic element;

laminating external electrode sheets which are composed of conductive material sheets to at least one of the uppermost layer and the lowermost layer of said laminated elementary body sheets to form a completed laminated body; and calcining the completed laminated body which is formed by laminating said elementary body sheets and said external electrode sheets, and said manufacturing method forming the external terminal electrodes upon completing of the calcining of the completed laminated body composed of said external electrode sheets.

2. A method of manufacturing a laminated chip electronic part which is composed of a laminated elementary body having internal conductors forming an electronic element, external terminal electrodes on at least one end surface corresponding to at least one of an upper layer and a lower layer in a laminated structure of said elementary body, and terminals of said electronic element which are connected to said external terminal electrodes, said manufacturing method comprising:

laminating a plurality of elementary body sheets composed of insulating material sheets which have internal conductors formed on surfaces thereof to form the electronic element;

laminating external electrode sheets composed of insulating material sheets which have one or more conductors forming external electrodes formed on the surfaces of the external electrode sheets and connecting via holes to at least one of the uppermost layer or the lowermost layer of said laminated elementary body sheets so as to expose the entire surfaces of the conductors to the external electrodes to form a completed laminated body; and calcining the completed laminated body which is formed by laminating said elementary body sheets and said external electrode sheets, and said conductors forming the external electrodes being the external terminal electrodes upon completion of the calcining step.

3. A method of manufacturing a laminated chip electronic part which is composed of a laminated elementary body having internal conductors forming an electronic element, external terminal electrodes on at least one end surface of the elementary body corresponding to at least one of an upper layer and a lower layer in a laminated structure of said elementary body, and terminals of said electronic element which are connected to said external terminal electrodes, said manufacturing method comprising:

laminating a plurality of elementary body sheets composed of insulating material sheets which have internal conductors formed on surfaces thereof to form the electronic element;

forming a laminated body which is formed by laminating said elementary body sheets;

printing conductors forming external electrodes in a conductive paste onto the end surface formed on at least one of an uppermost layer and a lowermost layer of said laminated body; and calcining the laminated body which has the conductors for external electrodes printed on said at least one end surface, and said conductors forming the external electrodes being the external terminal electrodes upon completion of the calcining step.

4. A method of forming an electronic chip component by applying external electrodes to a laminated elementary body having plural insulating first sheets with faces having approximately the same plan view geometry and carrying first internal conductors, the body including second internal conductors electrically connecting a plurality of the first internal conductors together, the second internal conductors extending to least one end face of the elementary body, the method comprising:

laminating a second sheet with opposed first and second faces having approximately the same plan view geometry as the plural first sheets to the laminated elementary body so the first and second sheets are aligned, the faces of the second sheet being electrically conducting and connected, the second sheet being laminated to the elementary body while the first electrically conducting surface abuts and is electrically connected to one of the second internal conductors and the second electrically conducting surface is exposed, and calcining the laminated elementary body with the second sheet laminated to it.

5. The method of claim 4 wherein the chip component includes first and second of the second internal conductors, the first and second of the second internal conductors respectively extending to opposite first and second end faces of the elementary body, wherein the laminating step includes laminating first and second of said sheets having the first and second opposed electrically conducting surfaces to the first and second end faces, respectively, so the first electrically conducting surface of said first sheet abuts and is electrically connected to the first of the second internal conductors and the second electrically conducting surface of said first sheet is exposed, and the first electrically conducting surface of said second sheet abuts and is electrically connected to the second of the second internal conductors and the second electrically conducting surface of said second sheet is exposed, and wherein the calcining step includes calcining the laminated elementary body with the first and second sheets laminated to it.

6. The method of claim 4 wherein the chip component includes first and second of the second internal conductors that extend to the same one end face of the elementary body, said sheet having the first and second opposed electrically conducting and connected surfaces carrying first and second spaced and mutually insulated external electrodes, the first external electrode being on the first and second of the opposed surfaces, the second external electrode being on the first and second of the opposed surfaces, wherein the laminating step includes laminating the sheet carrying the first and second external electrodes to the elementary laminated body so the first and second of the second internal conductors respectively abut and are electrically connected to the first and second electrodes, and the calcining step includes calcining the elementary laminated body while the sheet carrying the first and second spaced electrodes are laminated to the elementary laminated body.

* * * * *